United States Patent [19]

Saito

[11] Patent Number: 4,776,526
[45] Date of Patent: Oct. 11, 1988

[54] FISHING REEL WITH VARIABLE BRAKING RANGE

[75] Inventor: Shoji Saito, Tokyo, Japan

[73] Assignee: Daiwa Seiko, Inc., Tokyo, Japan

[21] Appl. No.: 89,006

[22] Filed: Aug. 20, 1987

Related U.S. Application Data

[63] Continuation of Ser. No. 856,977, Apr. 29, 1986, abandoned.

[30] Foreign Application Priority Data

May 24, 1985 [JP] Japan .............................. 60-77327[U]

[51] Int. Cl.[4] ............................................. A01K 89/02
[52] U.S. Cl. ................................ 242/84.5 A; 242/84.5
[58] Field of Search ................... 242/84.5 R, 84.5 A, 242/84.5 P, 84.51 R, 84.51 A, 84.53

[56] References Cited

U.S. PATENT DOCUMENTS

| | | | |
|---|---|---|---|
| 3,023,978 | 3/1962 | Denison | 242/84.5 A |
| 3,368,182 | 8/1966 | Clark | 242/84.53 |
| 3,810,592 | 5/1974 | Host | 242/84.51 A |
| 4,391,419 | 7/1983 | Iwama | 242/84.5 P |
| 4,522,347 | 6/1985 | Swisher | 242/84.5 A |
| 4,591,108 | 5/1986 | Ban | 242/84.5 R |

*Primary Examiner*—Stuart S. Levy
*Assistant Examiner*—Katherine Matecki
*Attorney, Agent, or Firm*—Browdy and Neimark

[57] ABSTRACT

A spinning reel for fishing, having an improved braking drag regulating structure, which is provided with a locking stoper on the portion of a reel casing over which an operating lever is moved forward and backward, and a locking member formed on the operating lever and adapted to be engaged with the stopper and thereby lock the operating lever, either of the stopper and locking member being made movable so that these two parts can be released from the engaging force. Therefore, the range of pivotal movement of the operating lever can be changed instantly with ease from a wide range to a narrow range, and vice versa. This braking drag regulating structure can prevent the occurrence of both the breakage and the slackening of a fishline.

9 Claims, 6 Drawing Sheets

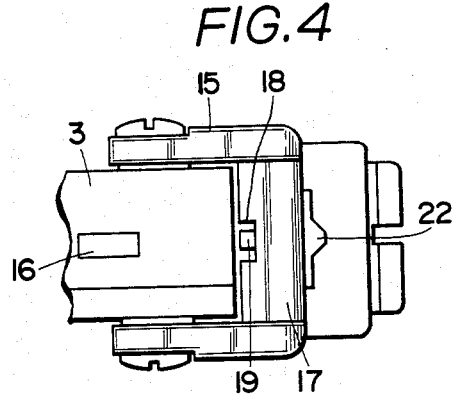
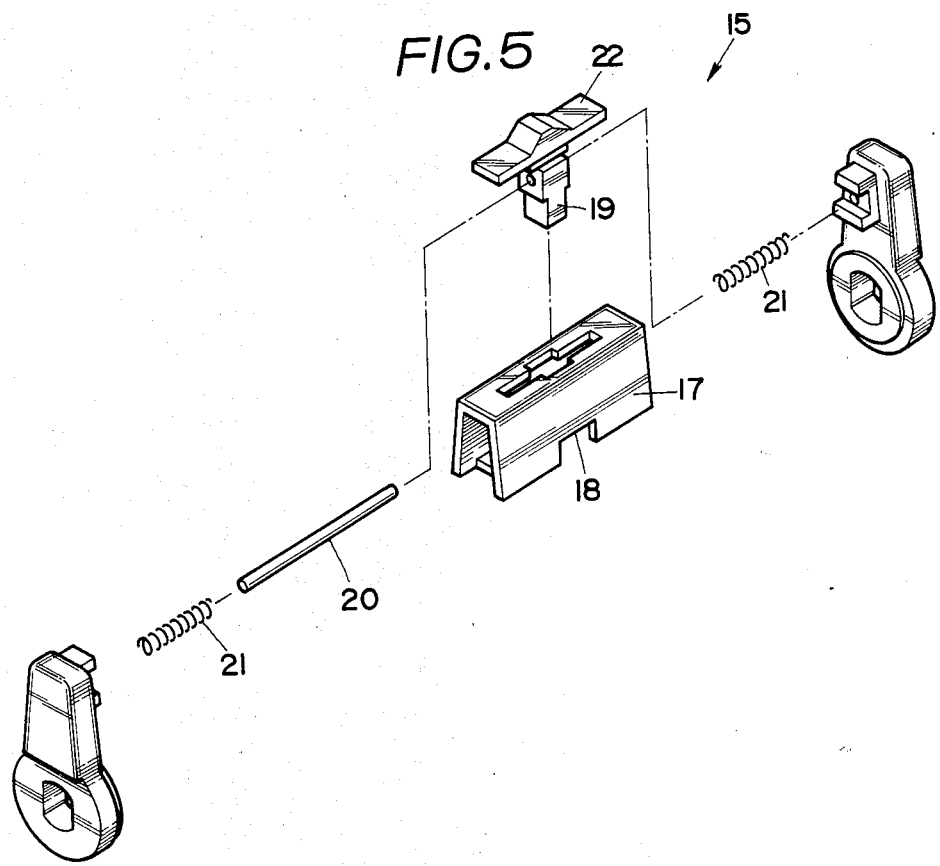

FISHING REEL WITH VARIABLE BRAKING RANGE

This application is a continuation of Ser. No. 856,977, filed Apr. 29, 1986, now abandoned.

BACKGROUND OF THE INVENTION

1. Field of the Invention:

This invention relates to an improvement in a structure for regulating a drag mechanism for a spool in a spinning reel for fishing, in which the range of levels to which a drag is regulated, is limited more than that in a conventional structure of this kind, so as to prevent the excessive tightening of the drag, which causes the breakage of a fishline, and the excessive loosening of the drag, which causes the slackening of a fishline, and thereby enable the drag to be operated optimumly during the fishing.

2. Description of the Prior Art:

The so-called rear drag systems, in each of which a braking mechanism is provided at the rear portion of a spool shaft, are known as drag regulating mechanisms for spinning reels. In all of these drag regulating mechanisms used at present time, the drag is regulated to a suitable spool shaft braking force between a minimum spool shaft braking force and a maximum spool shaft braking force so as to decrease and increase the spool shaft braking force continuously in accordance with the kind of an object fish and the fishing conditions.

However, in practice, the regulation of the drag must be done momentarily and frequently in accordance with the fishing condition, and requires a great deal of skill. If the braking of the spool shaft cannot be done suitably by the drag, a fish would be lost. Moreover, too large a braking force is applied to the spool shaft by mistake to cause the fishline to be cut, or, conversely, the drag is excessively loosened to cause the fishline to be slackened, i.e., become wavy.

SUMMARY OF THE INVENTION

An object of the present invention is to eliminate these drawbacks encountered in a conventional spinning reel for fishing.

The first characteristics of the present invention reside in its capability of providing a spinning reel which is capable of freely widening and narrowing the range of regulation of a braking force applied from a drag to a spool shaft. When the drag is set to a normally-used narrow range of regulation, the spinning reel can be operated easily in response to the sudden and frequent application of a braking force from the drag to the spool shaft during the fishing to thereby prevent the occurrence of the inconveniences like those in a conventional spinning reel of this kind, which include the breakage of a fishline due to the inadvertent application of an excessively large braking force from the drag to the spool shaft, and the slackening of the fishline due to the inadvertent excessive loosening of the drag. When it is necessary to take up the fishline forcibly or release the braking force from the spool shaft, the range of regulation of the drag can be widened to easily meet these requirements, so that the spinning reel according to the present invention enables the fishing to be done simply without requiring skill.

The second characteristics of the present invention reside in its capability of providing a spinning reel which is capable of widening and narrowing the range of regulation of a braking force, which is applied from a drag to a spool shaft, freely and speedily with ease by a single touching operation so that the range of braking force of the drag can be changed instantly in accordance with the fishing condition from a wide range to a narrow range, and vice versa.

The third characteristics of the present invention reside in its capability of providing a spinning reel which is capable of restricting the range of pivotal movement of a lever, by which the braking force applied from a drag to a spool shaft is regulated, in both side portions or one side portion thereof, and shifting an operation for widening the range of regulation of the braking force, which is applied from the drag to the spool shaft, to an operation for narrowing the same range, and vice versa in the large and small braking force portions of this range, or in either the large braking force portion and the small braking force portion thereof, whereby the fishing can be done in a wide range of regulation of the drag.

The above and other objects as well as advantageous features of the invention will become apparent from the following description of the preferred embodiments taken in conjunction with the accompanying drawings.

BRIEF DESCRIPTION OF THE DRAWINGS

FIG. 4 is a plan view of a principal portion of the present invention;

FIG. 5 is an exploded view in perspective of the principal portion;

DESCRIPTION OF THE PREFERRED EMBODIMENTS

Figure 1:
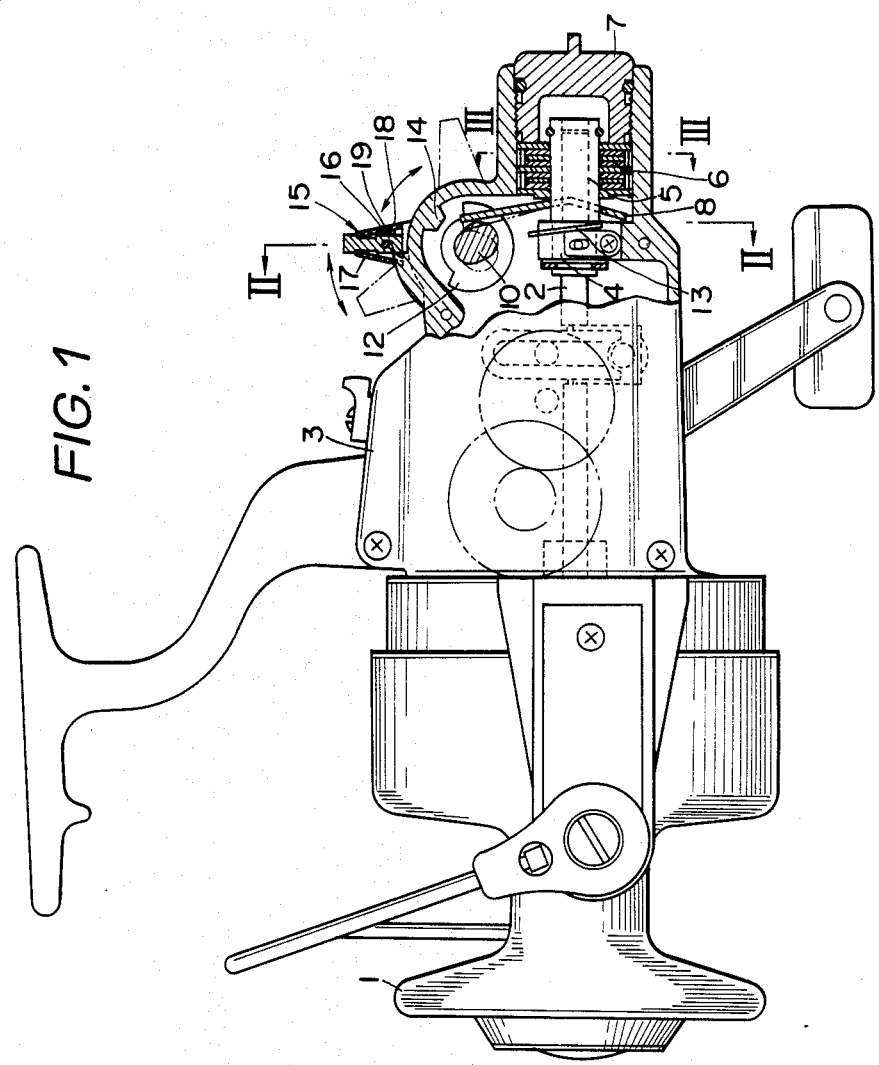
FIG. 1 is a partially-sectioned front elevation of the present invention.
Figure 2:
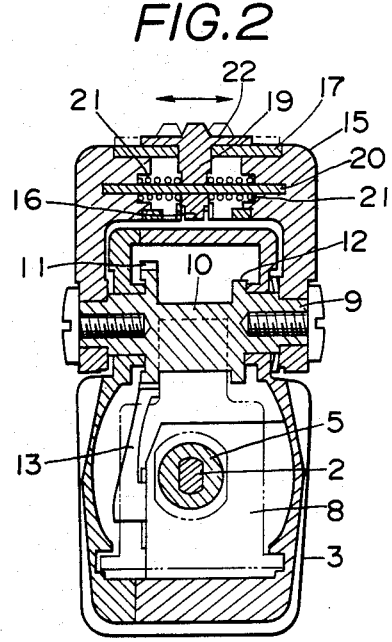
FIG. 2 is a sectional view taken along the line II—II in FIG. 1.
Figure 3:
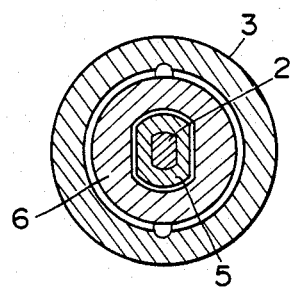
FIG. 3 is a sectional view taken along the line III—III in FIG. 1.

The embodiments of the present invention will now be described with reference to the drawings. A spool shaft 2 to the front end of which a spool 1 is fixed is supported pivotably on a bearing boss 4 which is provided at the rear portion of a casing 3. The rear end portion of the spool shaft 2 is fitted in a shaft portion, of which the diametrically opposite portions of the outer circumferential surface are beveled along the axially parallel planes, of a metal cylinder 5. A known braking drag member 6 is fitted around the metal cylinder 5, and the rear portion of the braking drag member 6 is supported on a regulating cylinder 7 screwed into the reel casing 3. A leaf spring 8 is engaged with the front portion of the braking member 6.

The upper end portion of the leaf spring 8 is engaged with a cam 10 which is joined pivotably to the reel casing 3 via a pivot 9. Locking teeth 11 are fixed to one side of the cam 10, and a restriction cam 12 to the other side thereof. A spring rod 13 is engaged with the locking teeth 11, and the restriction cam 12 is formed so that it engages a projection 14 on the inner surface of the reel casing 3 so as to be restricted with respect to its pivotal movement. An operating lever 15 is also mounted on the pivot 9 so that the lever 15 can be turned in the forward and backward directions along the outer surface of the reel casing 3. The operating lever 15 is moved reciprocatingly in the forward and backward directions to vary the magnitude of the pressing force of the cam 10 against the leaf spring 8 and thereby enable the braking force of the braking drag member 6 against the spool shaft 2 to be regulated.

A narrow locking stopper 16 is projected from the part of the front portion of the upper surface of the reel casing 3 over which the operating lever 15 is moved forward and backward. A recess 18, in and through which the locking stopper 16 can be fitted and passed, is provided in a bridge frame 17 in the operating lever 15. The bridge frame 17 is provided therein with a locking member 19 so that the locking member 19 can be moved slidingly in the lateral direction by a guide rod 20. Springs 21, 21 are provided around the portions of the guide rod 20 which are on both sides of another portion thereof in which the locking member 19 is fitted firmly, in such a manner that the locking member 19 can be held under pressure in the recess 18. A handle 22 is fixed to the upper end of the locking member 19.

In this embodiment constructed as mentioned above of the present invention, the operating lever 15 is moved forward and backward in a normal case between a position of a minimum braking force in which the restriction cam 12 engages the projection 14 and a position in which the locking member 19 engages the stopper 16, to regulate the braking force of the braking drag member 6 against the spool shaft 2 in accordance with the magnitude of the pressing force during the movement of the operating lever 15 of the cam 10 against the leaf spring 8.

When it is necessary to increase the braking force against the spool shaft 2, the locking member 19 is moved laterally by the handle 22 to disengage the locking member 19 from the stopper 16, so that the operating lever 15 can be passed at its recess 18 along the stopper 16 and turned further in the forward direction. Consequently, the braking force of the drag member can be increased to a level in the range of a large braking force.

Figure 6:
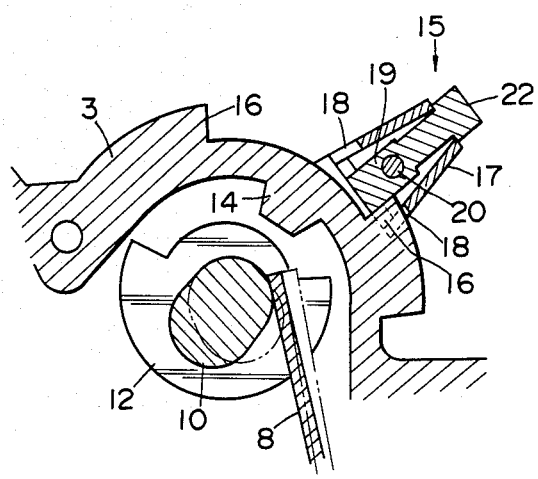
FIG. 6 is a sectioned front elevation of a second embodiment of the present invention.

In an embodiment shown in FIG. 6, another locking stopper 16 is provided at a rear portion of the range of pivotal movement of the operating lever 15 so that the braking force of the drag member can be varied in the front and rear portions of the range of movement of the operating lever. Thus, the braking force of the drag member can be regulated to high and low levels in a minimum range thereof in addition to high and low levels in a maximum range thereof.

Figure 7:
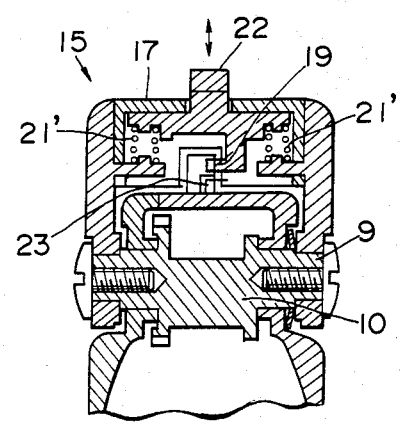
FIG. 7 is a sectioned side elevation of a third embodiment of the present invention.
Figure 8:
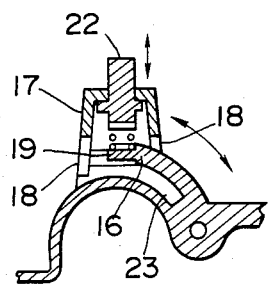
FIG. 8 is a sectioned front elevation of a principal portion of the embodiment of FIG. 7.

In an embodiment shown in FIGS. 7 and 8, a locking member 19 is formed so that it engages a locking stopper 16 with the locking member 19 urged upward by springs 21'. A guide recess 23 is formed at the lower side of the locking stopper 16. When the range of braking force is changed, a handle 22 is pressed down to disengage the locking member 19 from the stopper 16 in the downward direction and move the locking member 19 in the guide recess 23, whereby an operating lever 15 can be turned beyond the stopper 16.

Figure 9:
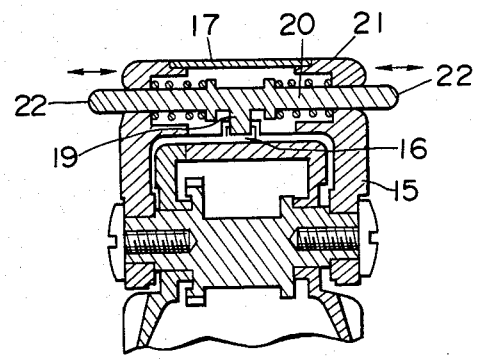
FIG. 9 is a sectioned side elevation of a fourth embodiment of the present invention.

In an embodiment shown in FIG. 9, a locking member 19 is formed integrally with a laterally slidable guide rod 20, and projecting portions of the guide rod 20 are used as handles 22 so as to disengage the locking member 19 from a locking stopper 16 by the lateral sliding effect of the guide rod 20.

Figure 10:
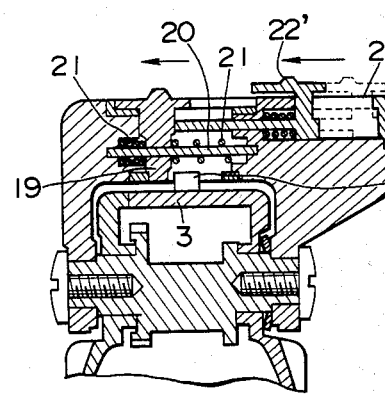
FIG. 10 is a sectioned side elevation of a fifth embodiment of the present invention.
Figure 11:
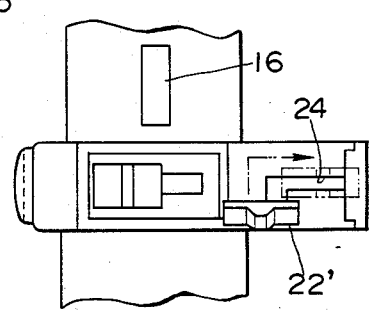
FIG. 11 is a plan view of the embodiment of FIG. 10.

In an embodiment shown in FIGS. 10 and 11, a handle 22' is formed separately from a locking member 19 so that the locking member 19 can be held in a predetermined position when it is disengaged from a locking stopper 16 at the time of changing the range of braking force. The handle 22' is formed so that it can be turned in a hook-shaped recess 24 and locked in a pressing position to thereby enable the locking member 19 to be held in a position in which it is disengaged from the stopper 16.

Figure 12:
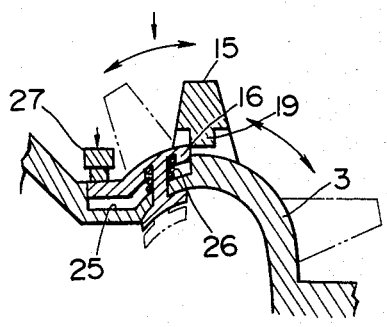
FIG. 12 is a sectioned front elevation of a sixth embodiment of the present invention.
Figure 13:
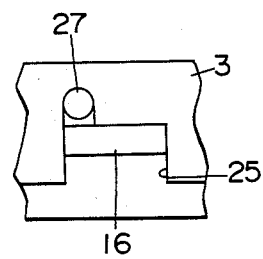
FIG. 13 is a plan view of the embodiment of FIG. 12.

In an embodiment shown in FIGS. 12 and 13, a recess 25, which a locking stopper 16 can engage, is provided in a reel casing 3, and the locking stopper 16 is urged upward by a spring 26. When the braking force of a braking member is changed, the locking stopper 16 is fitted in the recess 25 by a push member 27 provided at the front end portion of the stopper 16, to enable a locking member 19 of an operating lever 15 to pivotally pass the upper portion of the stopper 16.

Figure 14:
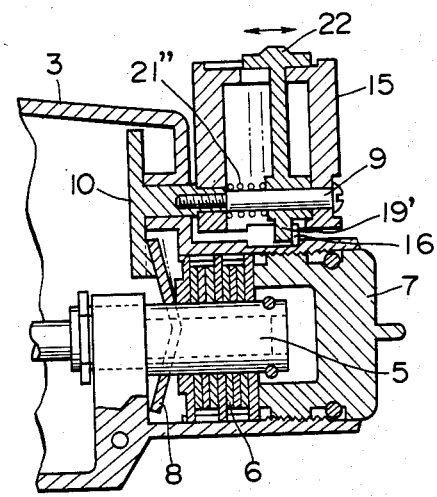
FIG. 14 is a sectioned front elevation of a seventh embodiment of the present invention.
Figure 15:
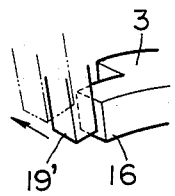
FIG. 15 is a perspective view of a principal portion of the embodiment of FIG. 14.

In an embodiment shown in FIGS. 14 and 15, a cam surface for pressing a leaf spring 8 is formed on the rear side of a cam 10, and an operating lever 15 so as to be moved forward and backward in the lateral direction of a reel casing 3. A locking member 19' having a handle 22 at its upper end and urged backward by a spring 21" is mounted on a pivot 9 of the operating lever 15 so that the locking member 19' can be moved slidingly in the longitudinal direction. When the braking force of a braking member is changed, the handle 22 is pressed forward to disengage the operating lever 15 from a locking stopper 16 and thereby enable the operating lever 15 to be further turned.

As described above, the present invention is directed to a spinning reel of a rear drag system, in which a locking stopper is provided on the portion of a reel casing over which the operating lever is moved forward and backward, a locking member engageable with the locking stopper being provided on the operating lever. Either the locking stopper or the locking member is formed movably so that, when these two parts are disengaged from each other, the range of pivotal movement of the operating lever can be changed from a wide range to a narrow range, and vice versa to thereby enable the range of regulation of braking force of a drag member from a wide range to a narrow range, and vice versa. The drag member is operated usually in the most necessary range of regulation of braking force to enable the operating lever to be moved smoothly and easily in accordance with sudden and frequent demands for operating the braking drag member during the fishing. Therefore, the present invention can prevent the occurence of the inconveniences in a conventional spinning reel of this kind, which include the breakage of a fishline due to the inadvertent excessive tightening of a drag member, and the slackening of a fishline due to the inadvertent excessive loosening thereof. When it is necessary to forcibly take up a fishline or release a spool shaft from a braking force, the range of regulation of braking force is changed so as to widen the same to a maximum range of braking force or a minimum range of braking force to thereby meet such requirements easily. Thus, a wide-range operation of the drag member, which suits the fishing condition, can be carried out. Moreover, the changing of the range of spool shaft braking force can be done very easily, and this constitutes the excellent practicality of the present invention.

The present invention is not, of course, limited to the above embodiments; it may be modified in various ways within the scope of the appended claims.

What is claimed is:

1. A spinning reel for fishing, comprising
   a spool shaft with a front end and a rear portion,
   a spool fixed to said front end of said spool shaft,
   a reel casing having an outer surface, said spool shaft being supported slidalby on said reel casing,
   a braking drag member having a side surface, said braking drag member being mounted on said rear portion of said spool shaft for providing a braking force on said spool shaft,
   a pressing member engaged with said side surface of said braking drag member, to provide a pressure on said drag member,
   a cam having an upper end portion and being pivotably supported on said reel casing, said pressing member slidingly contacting said upper end portion of said cam, said cam having a shaft, and
   an operating lever mounted on said shaft of said cam so that said operating lever has pivoting movement in opposite forward and backward directions on said outer surface of said reel casing, said front direction corresponding to said front end of said spool shaft and said backward direction corresponding to said rear portion of said spool shaft,
   a locking stopper provided on a portion of said reel casing over which said operating lever is pivoted in said forward and backward directions; and
   a locking member provided on said operating lever and adapted to provide an engagement with said locking stopper and to thereby limit the pivoting movement of said operating lever;
   wherein a pivotal movement of said operating lever causes said cam to be turned to cause the magnitude of said braking force of said braking drag member applied to said spool shaft to be regulated in accordance with said pressure applied from said pressing member to said braking drag member, a predetermined one of said locking stopper and said locking member including movable means for preventing said engagement therebetween, so that the range of said pivoting movement of said operating lever can be changed freely from a narrow range, when said locking stopper and said locking member are permitted to engage each other, to a wide range, when said engagement between said locking stopper and said locking member is prevented, said narrow range being fully overlapped by said wide range.

2. The reel of claim 1, wherein said predetermined one is said locking member.

3. The reel of claim 1, wherein said predetermined one is said locking stopper.

4. The reel of claim 1, wherein said portion of said reel casing on which said locking stopper is provided is located such that a part of said wide range which does not overlap with said narrow range corresponds to the larger magnitudes of said braking force.

5. The reel of claim 1, wherein a plurality of said locking stoppers are provided on respective portions of said reel casing, which portions correspond to both a large braking force-generating portion and a small braking force-generating portion of said range of pivotal movement of said operating lever.

6. The reel of claim 1, wherein said narrow range occupies a part of said wide range having the smaller braking force within said wide range.

7. The reel of claim 1, wherein said locking member and said locking stopper include means for allowing said operating lever to move freely from a part of said wide range not overlapping said narrow range into said narrow range regardless of said engagement between said locking member and locking stopper.

8. The reel of claim 1, wherein said cam shaft is aligned perpendicularly to a line parallel to the spool shaft and at a distance from said spool shaft.

9. The reel of claim 1, wherein the braking drag member including means for varying said braking force of said braking drag member on said spool shaft independently of said pivoting movement of said operating lever and of operation of said release means for preventing said engagement of said locking member and locking stopper, whereby the magnitudes of said braking force within said narrow and wide ranges is determined by said braking drag member.

* * * * *